US009736241B2

(12) United States Patent
Hathorn et al.

(10) Patent No.: US 9,736,241 B2
(45) Date of Patent: *Aug. 15, 2017

(54) MAINTENANCE OF A FABRIC PRIORITY AMONG OPERATIONS WITHIN A FIBRE CHANNEL EXCHANGE

(71) Applicant: INTERNATIONAL BUSINESS MACHINES CORPORATION, Armonk, NY (US)

(72) Inventors: Roger G. Hathorn, Tucson, AZ (US); Bret W. Holley, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/317,464

(22) Filed: Jun. 27, 2014

(65) Prior Publication Data
US 2015/0381529 A1    Dec. 31, 2015

(51) Int. Cl.
*H04L 29/08* (2006.01)
*H04L 12/851* (2013.01)

(52) U.S. Cl.
CPC .......... *H04L 67/1097* (2013.01); *H04L 47/24* (2013.01)

(58) Field of Classification Search
CPC ..... H04L 49/357; H04L 12/42; H04L 47/245; H04L 47/39; H04L 67/1097
See application file for complete search history.

(56) References Cited

U.S. PATENT DOCUMENTS

| 6,000,020 | A | 12/1999 | Chin et al. |
|---|---|---|---|
| 6,253,260 | B1 | 6/2001 | Beardsley et al. |
| 7,606,986 | B1 | 10/2009 | Limaye et al. |
| 7,721,022 | B2 | 5/2010 | Brewer et al. |
| 7,843,907 | B1 | 11/2010 | Abou-Emara et al. |
| 8,032,730 | B2 | 10/2011 | Hara |
| 8,160,072 | B1 * | 4/2012 | Gnanasekaran .... H04L 47/2441 370/229 |
| 8,504,670 | B2 | 8/2013 | Wu et al. |
| 8,537,706 | B2 | 9/2013 | Cardona et al. |
| 8,762,416 | B1 | 6/2014 | Corbett |
| 2004/0042459 | A1 | 3/2004 | Chen et al. |
| 2004/0085994 | A1 | 5/2004 | Warren et al. |
| 2005/0102479 | A1 | 5/2005 | Innan et al. |
| 2005/0114460 | A1 | 5/2005 | Chen et al. |

(Continued)

OTHER PUBLICATIONS

US Application Docket No. filed Jun. 27, 2014, for "Maintenance of a Fabric Priority Among Operations in Related Fibre Channel Exchanges", by inventors R.G. Hathorn, Bret W. Holley, and Harry M. Yudenfriend, Total 37 pp.

(Continued)

*Primary Examiner* — Chandrahas Patel
(74) *Attorney, Agent, or Firm* — Rabindranath Dutta; Konrad Raynes Davda & Victor LLP

(57) ABSTRACT

A first device that is coupled to a second device receives a first Fiber Channel frame, wherein the first Fiber Channel frame has a priority indicated by the second device. The first device responds to the second device with a second Fiber Channel frame that has an identical priority to the priority indicated by the second device.

21 Claims, 10 Drawing Sheets

(56) References Cited

U.S. PATENT DOCUMENTS

2005/0289197 A1 12/2005 Kan et al.
2007/0180168 A1 8/2007 Chikusa et al.
2008/0008202 A1 1/2008 Terrell et al.
2008/0288949 A1 11/2008 Bohra et al.
2009/0316721 A1 12/2009 Kanda
2010/0250785 A1 9/2010 Shin et al.
2011/0173609 A1 7/2011 Buragohain et al.
2012/0159097 A1 6/2012 Jennas et al.
2014/0258658 A1 9/2014 Best et al.
2016/0357468 A1 12/2016 Hathorn et al.

OTHER PUBLICATIONS

US Application Docket No. filed Jun. 27, 2014, for "Maintenance of a Fabric Priority During Synchronous Copy Operations", by inventors R.G. Hathorn, Bret W. Holley, and Harry M. Yudenfriend, Total 47 pp.

"Fibre Channel SIngle-Byte Command Code Sets Mapping Protocol-5 (FC-SB-5)", Rev. 2.00, Mar. 26, 2013, INCITS Working Draft proposed American National Standard for Information Technology, pp. 269.

"Fibre Channel Link Services (FC-LS-3)", Rev. 3.10, Feb. 1, 2014, INCITS Working Draft proposed American National Standard for Information Technology, pp. 207.

"Fibre Channel Framing and Signaling-4 (FC-FS-4)", Rev. 0.50, May 16, 2014, INCITS Working Draft proposed American National Standard for Information Technology, pp. 448.

Office Action dated Apr. 29, 2016, pp. 19, for U.S. Appl. No. 14/317,517, filed Jun. 27, 2014.

Notice of Allowance dated Apr. 18, 2016, pp. 5, for U.S. Appl. No. 14/318,012, filed Jun. 27, 2014.

Notice of Allowance dated Jul. 20, 2016, pp. 9, for U.S. Appl. No. 14/318,012, filed Jun. 27, 2014.

Response dated Jul. 29, 2016, pp. 12, to Office Action dated Apr. 29, 2016, pp. 19, for U.S. Appl. No. 14/317,517, filed Jun. 27, 2014.

Notice of Allowance dated Nov. 22, 2016, pp. 22, for U.S. Appl. No. 14/317,517, filed Jun. 27, 2014.

U.S. Appl. No. 15/242,374, filed Aug. 19, 2016.

List of IBM Patents or Patent Applications Treated as Related dated Mar. 1, 2017, pp. 2.

* cited by examiner

US 9,736,241 B2

MAINTENANCE OF A FABRIC PRIORITY AMONG OPERATIONS WITHIN A FIBRE CHANNEL EXCHANGE

BACKGROUND

1. Field

Embodiments relate to the maintenance of a fabric priority among operations within a Fibre Channel exchange.

2. Background

Fibre Channel is a switched communications protocol that allows communication among computing devices. Fibre Channel may be considered to be a channel and network hybrid, containing enough network features to provide the needed connectivity, distance and protocol multiplexing, and enough channel features to retain simplicity, repeatable performance and reliable delivery. Fibre Channel is capable of transmission of frames at rates extending from 1 Gbps (gigabits per second) to 16 Gbps or more. It is also able to transport commands and data according to existing protocols such as Internet protocol (IP), Small Computer System Interface (SCSI), High Performance Parallel Interface (HIPPI) and Intelligent Peripheral Interface (IPI), etc.

In certain situations, Fibre Channel is used to connect one or more devices, where the devices may include computing and storage devices. In the terminology of Fibre Channel, each of these devices is considered a node. One node may be connected directly to another, or may be interconnected, such as, via a Fibre Channel fabric. The fabric may be a single Fibre Channel switch, or a group of switches acting together. Multiple Fibre Channel switches may be combined into a single fabric.

Fibre Channel data is formatted into variable length frames. Each frame may include a header and a data payload field. The integrated set of architectural standards that describe the formatting of Fibre Channel frames, data transfer mechanisms, and other aspects of the Fibre Channel architecture are being developed by the American National Standards Institute (ANSI).

"Fibre Channel Framing and Signaling-4 (FC-FS-4)", Rev. 0.50, published May 16, 2014 is a working draft proposed by ANSI, and describes the framing and signaling requirements for Fibre Channel links. "Fibre Channel Link Services (FC-LS-3)", Rev. 3.10, published Feb. 1, 2014 is a working draft proposed by ANSI, and describes the link services requirements for Fibre Channel.

FICON (Fibre Connection) is a Fibre Channel Protocol and may also be referred to by the formal names of FC-SB-3, FC-SB-4, or FC-SB-5. The protocol and functions specified by FC-SB-3 continues to be supported in FC-SB-4 and FC-SB-5, and further details of FC-SB-5 may be found in the publication, "FIBRE CHANNEL Single-Byte Command Code Sets Mapping Protocol-5 (FC-SB-5)", Rev. 2.0, published Mar. 26, 2013 by ANSI.

FICON is a Fibre Channel layer 4 protocol used to map certain types of channel to control unit cabling infrastructure and protocol onto standard Fibre Channel services and infrastructure, where a channel is a direct or a switched point-to-point connection between communicating devices. FICON uses two Fibre Channel exchanges for a channel to control unit connection—one for each direction. So while a Fibre Channel exchange is capable of carrying a command and response on a single exchange, the response to a FICON information unit (IU) is always on a different exchange from the IU to which it is a response. The two exchanges that implement a connection are called an exchange pair.

A storage controller is computational devices that controls access to one or more storage devices. Host computing systems may access data stored in the storage devices via the storage controller that may be coupled to the host via a Fabric. Thus the storage controller and hosts may operate in a Fibre Channel environment and may be coupled via a Fabric.

SUMMARY OF THE PREFERRED EMBODIMENTS

Provided are a method, a system, and a computer program in which a first device that is coupled to a second device receives a first Fibre Channel frame, wherein the first Fibre Channel frame has a priority indicated by the second device. The first device responds to the second device with a second Fibre Channel frame that has an identical priority to the priority indicated by the second device.

In certain embodiments, the first device is a storage controller that controls a plurality of storage devices, the second device is a host, and a fabric comprising one or more Fibre Channel switches couples the first device to the second device.

In additional embodiments, the priority is indicated by programming a CS_CTL/Priority field in a frame header corresponding to first Fibre Channel frame, and the identical priority is indicated by programming the CS_CTL/Priority field in the frame header corresponding to the second Fibre Channel frame.

In further embodiments, the first Fibre Channel frame and the second Fibre Channel frame are included in a same exchange, wherein an exchange is comprised of a plurality of sequences, and wherein each sequence is comprised of one or more frames.

In additional embodiments, the fabric transmits the first Fibre Channel frame, according to and with the priority indicated by the host to the storage controller. The fabric also transmits the second Fibre Channel frame according to and with the identical priority indicated by the storage controller to the host.

In certain embodiments, a determination is made as to whether the host, the fabric, and the storage controller support priority indication in frames prior to including priority indications in the frames.

In further embodiments, the fabric is a first fabric, and in response to determining that a second fabric does not support priority indication in frames, operations avoid indicating priority in frames sent from the host to the second fabric.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow priority of frames to be maintained within the same exchange, in computing environments that use the Fibre Channel Protocol. For example, in certain embodiments a host may send a Fibre channel frame to a fabric and indicate a priority for the Fibre Channel frame in a priority field in the header of the Fibre Channel frame. The fabric which supports priority indications for Fibre Channel frames may forward the Fibre Channel frame to a storage controller. As a result, the storage controller receives the priority indicated by the host. While responding to the host via the fabric, the storage controller responds with frames that have the same priority indicated originally by the host. As a result, the host receives the response of the storage controller with the same priority as the priority indicated by the host.

EXEMPLARY EMBODIMENTS

Figure 1:
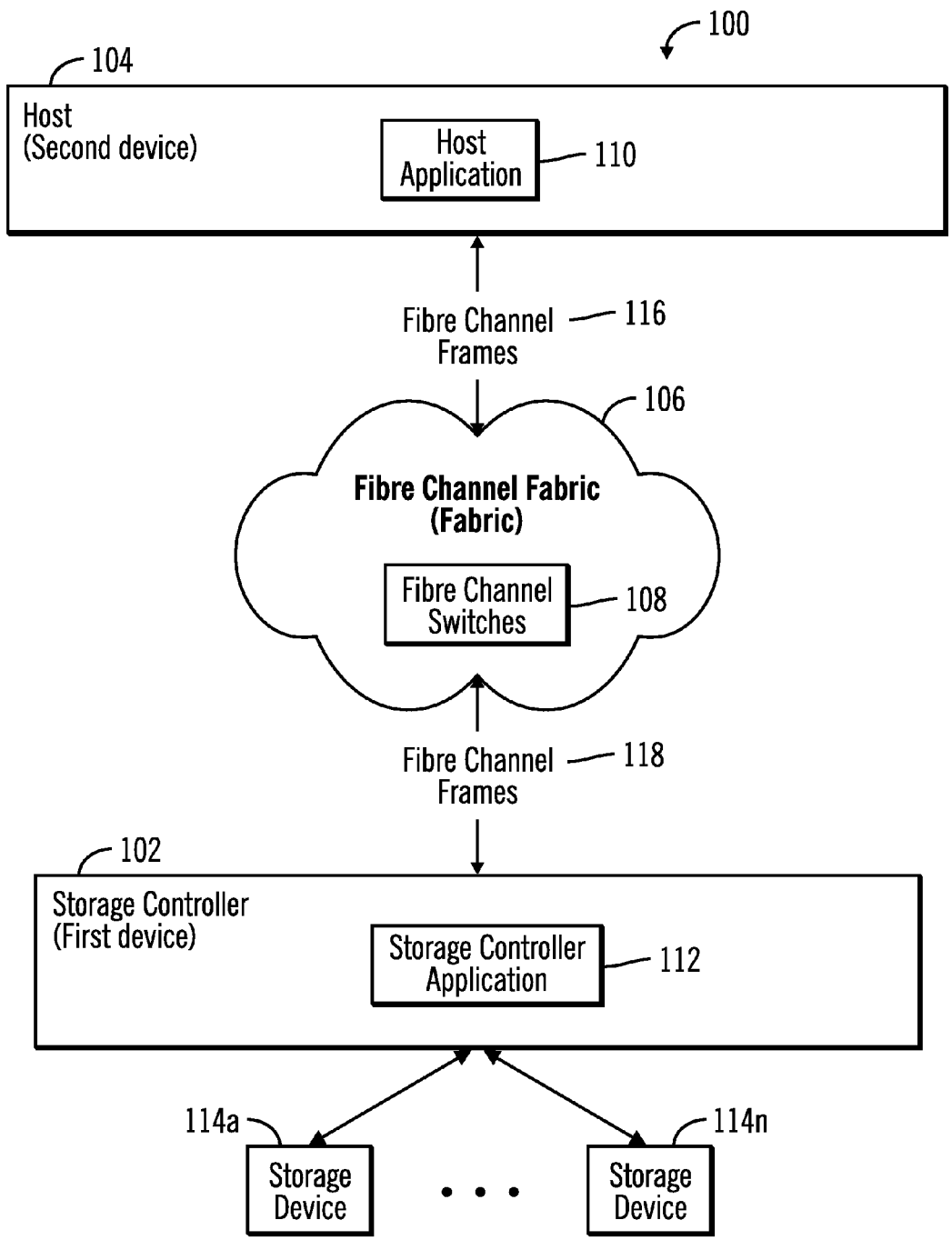
FIG. 1 illustrates a block diagram of a computing environment comprising a storage controller coupled to a host via a fabric, in accordance with certain embodiments.

FIG. 1 illustrates a block diagram of a computing environment 100 comprising a storage controller 102 coupled to a host 104 via a Fibre Channel fabric 106, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a Fibre Channel fabric 106, where the Fibre Channel fabric 106 is also referred to as a fabric. The fabric 106 is comprised of one or more Fibre Channel switches 108. A host application 110 executes in the host 104 and a storage controller application 112 executes in the storage controller 102, where the host application 110 and the storage controller application 112 may be implemented in software, hardware, firmware or any combination thereof.

The storage controller 102 controls access to one or more storage devices 114a . . . 114n that are coupled to the storage controller. While not shown in FIG. 1, in alternative embodiments, the coupling of the storage devices 114a . . . 114n to the storage controller 102 may also be via the fabric 106.

In certain embodiments, in accordance with the Fibre Channel Protocol, the host 104, the fabric 106, and the storage controller 102 may transmit or receive Fibre Channel frames 116, 118 among themselves as shown in FIG. 1.

In certain embodiments, the host 104 indicates a priority in Fibre Channel frames on commands intended for the storage controller 102 that are sent via the fabric 106. The storage controller 102 responds to the command from the host by sending Fibre Channel frames via the Fabric 106 with the same priority as the priority indicated by the host 104.

Figure 2:
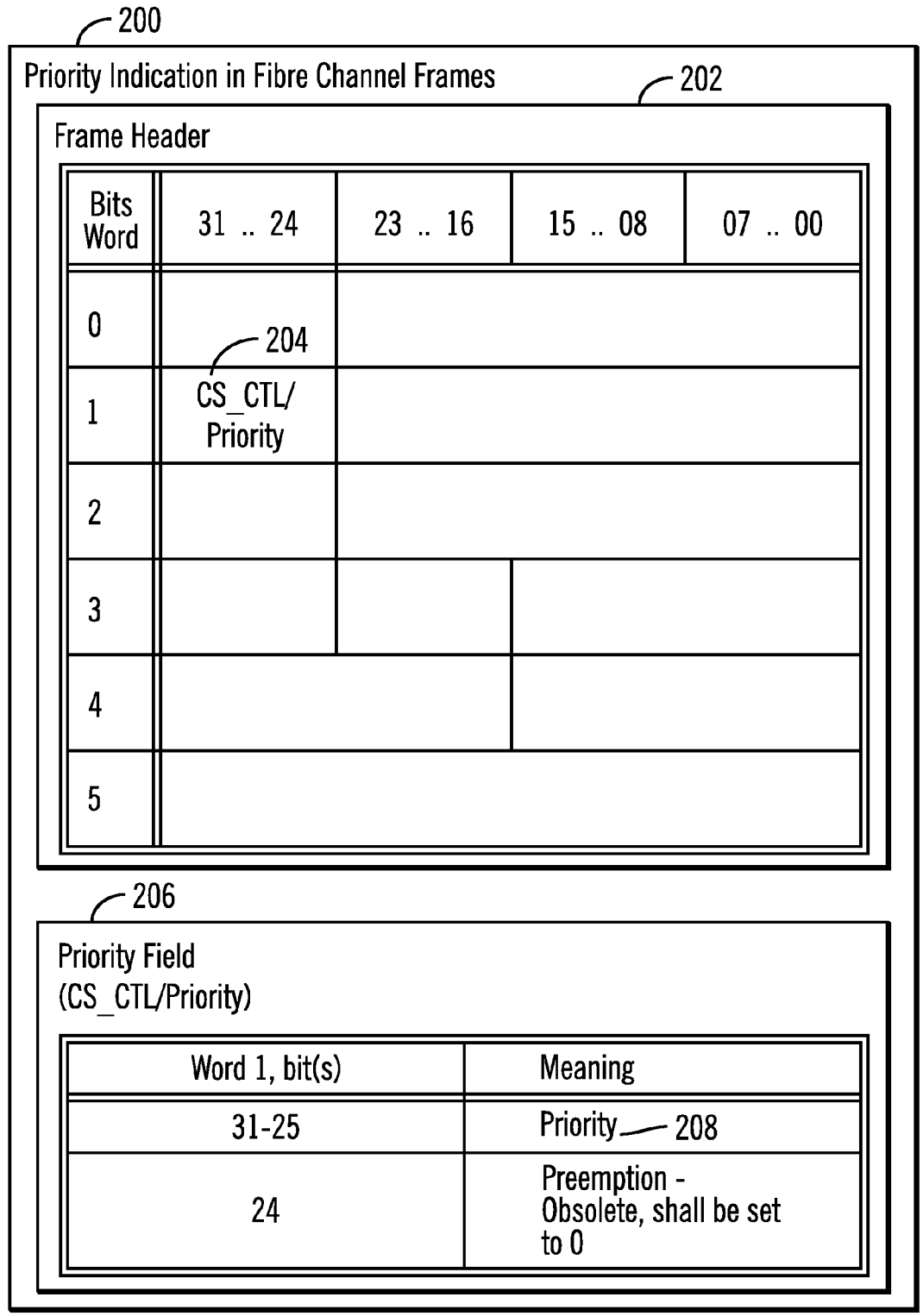
FIG. 2 illustrates a block diagram that how priority is indicated in a Fibre Channel frame, in accordance with certain embodiments.

FIG. 2 illustrates a block diagram 200 that how priority is indicated in a Fibre Channel frame, in accordance with certain embodiments.

FC-FS-4 provides a mechanism to indicate a priority in the header 202 of a Fibre Channel frame. The CS_CTL/Priority field 204 is used to indicate the priority of the Fibre Channel frame. In an exemplary CS_CTL/Priority field 206 bits 25-31 indicate the priority as shown via reference numeral 208. A value of 0000000b bits 31-25 indicates that no Priority has been assigned to the frame. The remaining values indicates, in ascending order, the relative priority of the frame (e.g., a Priority of 23h is considered to have a lower priority than a Priority of 57h). Higher priority frames (i.e., frames with a higher indicated priority) receive preferential treatment for processing, resources, transmission, etc. in comparison to lower priority frames (i.e., frames with a lower indicated priority).

Certain embodiments use Fiber Channel storage area network (SAN) architecture to provide mechanisms for a host application or operating system to specify a fabric priority to be used to manage input/output (I/O) requests through the SAN. The Fibre Channel standards allow for specification of an operation priority in each frame sent for the operation. Fibre channel switches 108 may use this information to provide a guaranteed (or a higher quality of service) for higher priority operations.

In order to support this function, the storage controller 102 is set to the same priority that is received in an I/O operation from a host 104, in all frames sent from the storage controller 102 that are related to the operation. This includes frames in the same exchange. The support and use of fabric priority in Fibre Channel frames is negotiated to avoid disruption to existing installations.

Figure 3:
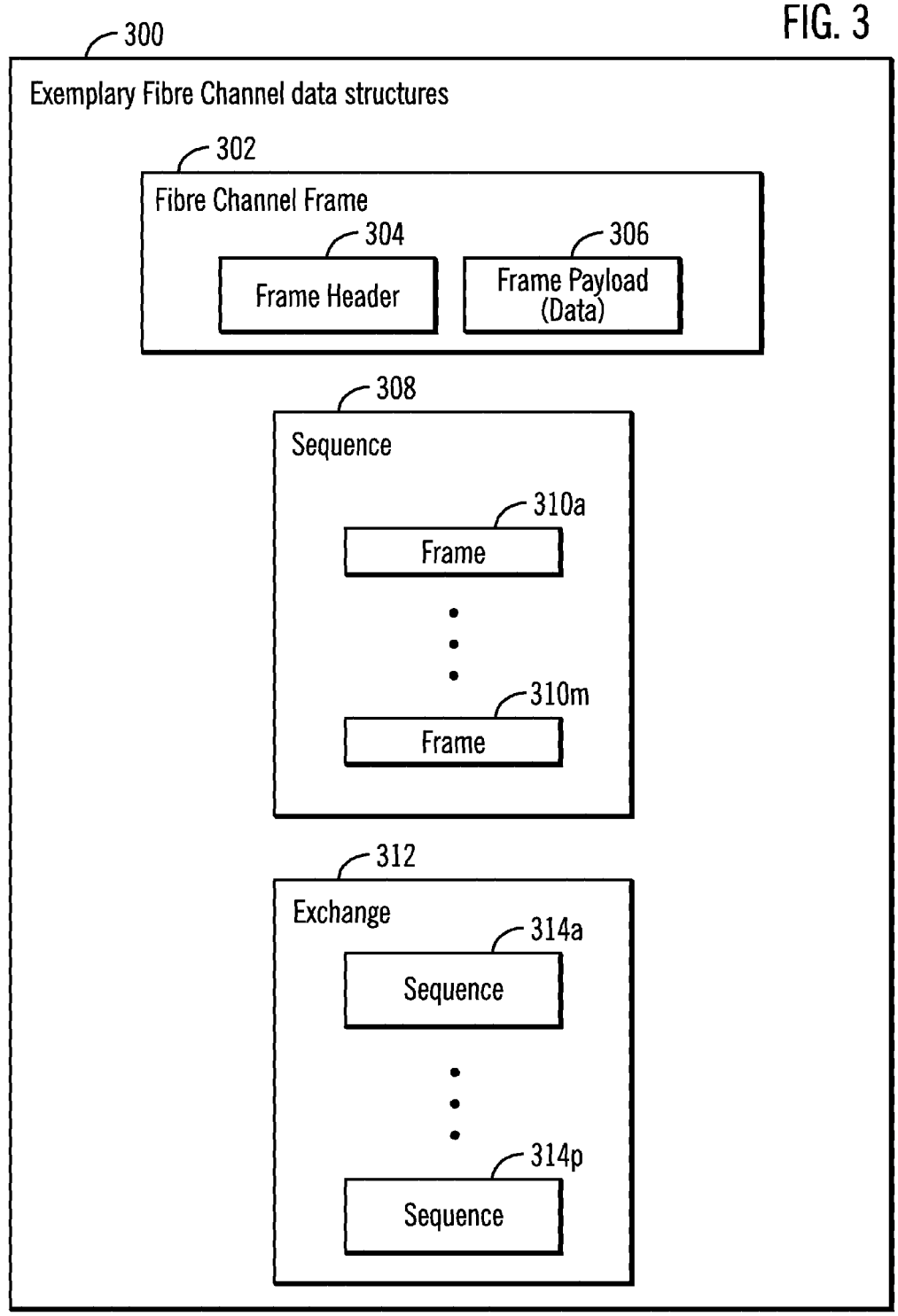
FIG. 3 illustrates a block diagram that shows exemplary Fibre Channel data structures, in accordance with certain embodiments.

FIG. 3 illustrates a block diagram that shows exemplary Fibre Channel data structures 300, in accordance with certain embodiments. A Fibre Channel frame 302 is comprised of a frame header 304 and a frame payload 306, where the frame header 304 may include control information and the frame payload 306 may include data. A sequence 308 is comprised of one or more frames 310a . . . 310m, and an exchange 312 is comprised of a plurality of sequences 314a . . . 314p.

Figure 4:
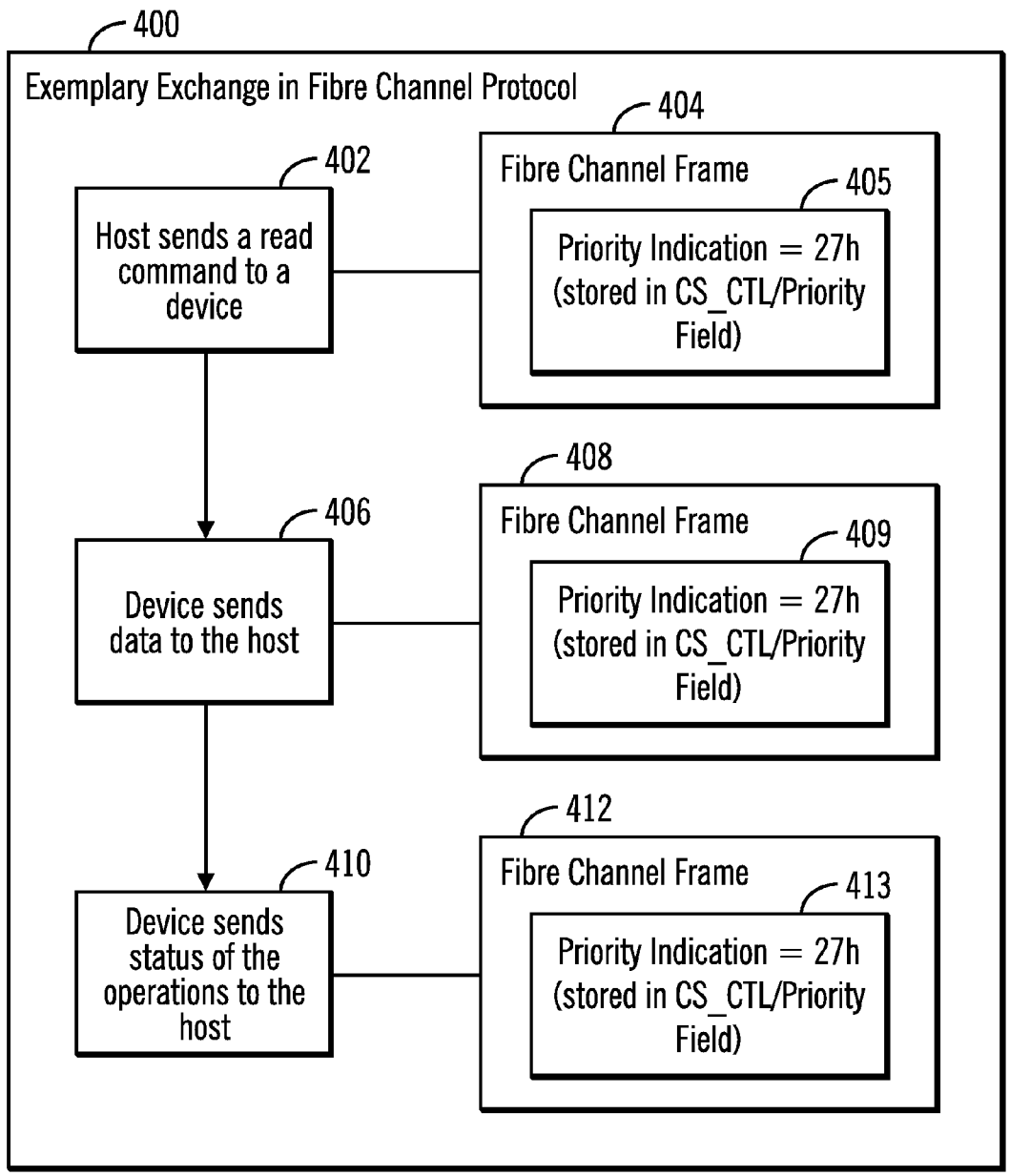
FIG. 4 illustrates a block diagram that shows an exemplary exchange in a Fibre Channel protocol, in accordance with certain embodiments.

FIG. 4 illustrates a block diagram 400 that shows an exemplary exchange in a Fibre Channel protocol, in accordance with certain embodiments. A host sends a read command to a device (at block 402) where the read command is sent via Fibre Channel frame(s) 404 that include the priority indication of 27h (reference numeral 405). The device in response sends data to the host (at block 406), where the data is sent via Fibre Channel frame(s) 408 that include the priority indication of 27h (reference numeral 409), i.e., the priority indication in the response of the device is the same as the priority indication in the read command from the host. Then the device sends the status of operations to the host (at block 410), where the status of operations is sent via Fibre Channel frame(s) 412 that include the priority indication of 27h (reference numeral 413). Therefore, in certain embodiments, the priority indication (e.g., 27h) in the responses of the device is the same as the priority indication (e.g., 27h) in the read command from the host. The three operations 402, 406, 410 are part of the same exchange.

Figure 5:
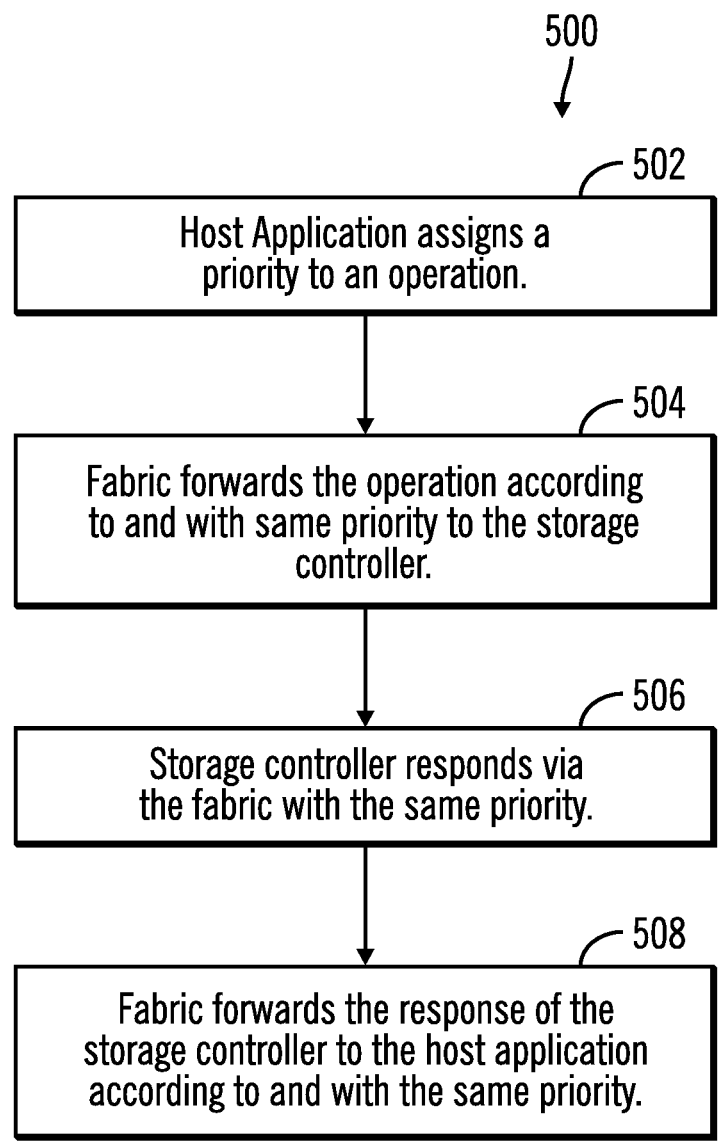
FIG. 5 illustrates a first flowchart that shows operations performed for maintaining priority within a single exchange, in accordance with certain embodiments.

FIG. 5 illustrates a first flowchart 500 that shows operations performed for maintaining priority within a single exchange, in accordance with certain embodiments. Control starts at block 502 in which a host application 110 assigns a priority to an operation. The fabric 106 forwards (at block 504) the operations according to and with the same priority to the storage controller 102. The storage controller 102 responds via the fabric 106 with the same priority (at block 506) and the fabric 106 then forwards (at block 508) the response of the storage controller 102 to the host application 110 according to and with the same priority. The priority is maintained within the same exchange by programming the CS_CTL/Priority field of the frame headers with the priority initially assigned by the host application 110 at block 502.

Figure 6:
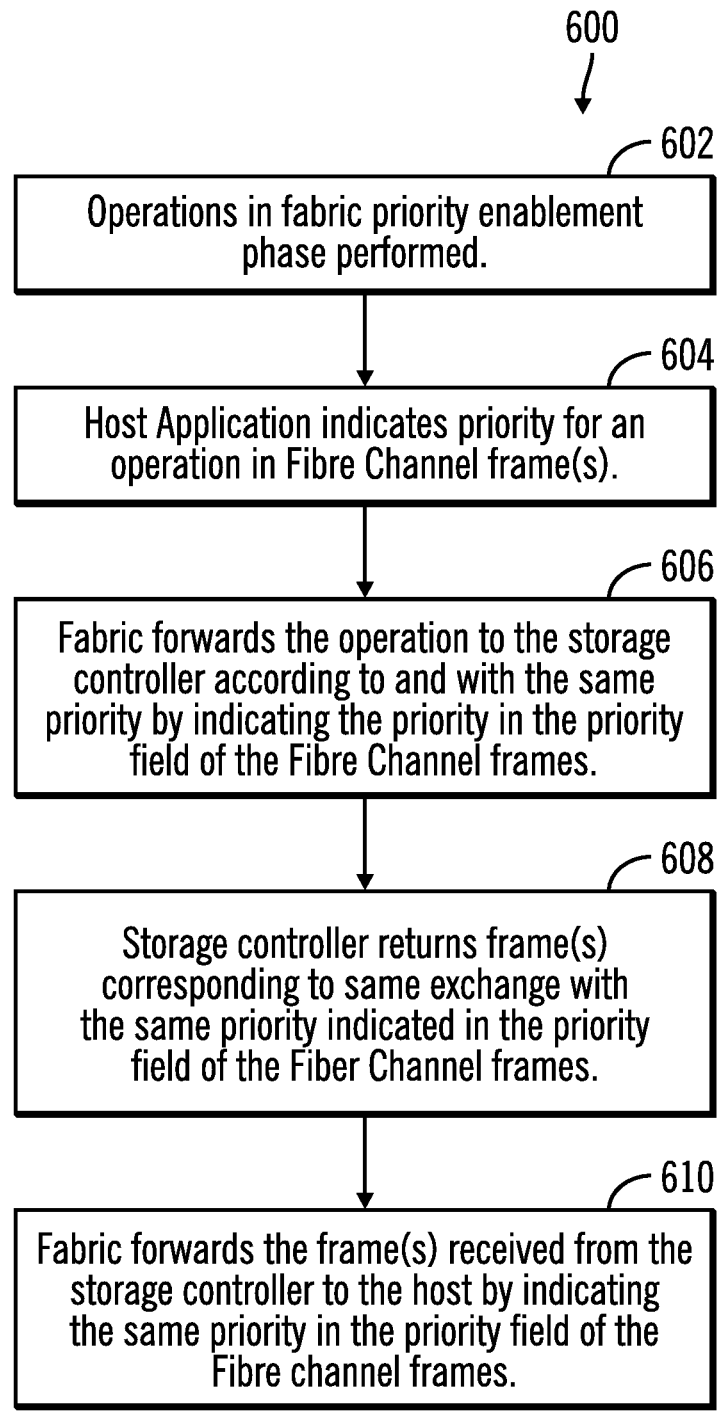
FIG. 6 illustrates a second flowchart that shows operations performed for maintaining priority within a single exchange, in accordance with certain embodiments.

FIG. 6 illustrates a second flowchart 600 that shows operations performed for maintaining priority within a single exchange, in accordance with certain embodiments.

In FIG. 6, in a first phase a fabric priority enablement is performed (at block 602) In fabric priority enablement, Fabric Login and N_Port login service parameters are used to negotiate use of Priority in frames sent and received (See FC-LS-3 rev 3.10). For N_Port Login, the host 104 sets the Priority bit (word 0, bit 23) to one to indicate tolerance for non-zero values in the Priority field in the frame header when CS_CTL/Priority Enable bit (F_CTL bit 17) is set to one. The target/control unit indicates tolerance for non-zero values in the Priority field by setting this bit to one in the LS_ACC.

For Fabric Login, the priority bit indicates support for a priority function. When an Nx Port performs Login with a Fabric (FLOGI), it requests support for use of the Priority field by setting the Priority bit (word 0, bit 23) to one. If Priority is set to one in both the FLOGI and the FLOGI LS_ACC, then both the Nx Port and fabric 106 have agreed that priority is available for use.

The storage device may indicate tolerance of non-zero values in Priority field (with F_CTL bit 17=1) by always setting the Priority service parameter bit to 1 for both class 2 and class 3 service parameters in a PLOGI ACC. The storage device may also indicate support for the fabric priority function by setting the Priority service parameter bit in the FLOGI service parameters for class 2 and 3. The received values of the Priority service parameter bits for class 2 and 3 may be recorded from the FLOGI LS_ACC and each PLOGI. If the Priority bit is set in both the FLOGI LS_ACC and a PLOGI, then the priority function is enabled for use with that remote N_Port (the port which is now logged in).

As a result of the fabric priority enablement operations, it is determined (at block 602) that the host 102, the fabric 106 and the storage controller 102 all support the indication of priority in Fibre Channel frames. The priority ranges supported are also determined so that suitable common priority ranges are used. Control proceeds to block 604 in which the host application 110 indicates a priority for an operation in Fibre Channel frames. The fabric 106 forwards (at block 606) the operation to the storage controller 102 according to and with the same priority by indicating the priority in the priority field of the Fibre Channel frames.

The storage controller 106 returns frame(s) corresponding to same exchange with the same priority indicated in the priority field of the Fiber Channel frames (at block 608). The fabric 106 forwards the frames(s) received from the storage controller 102 to the host 104 by indicating the same priority in the priority field of the Fibre Channel frames (at block 610) to ensure that the priority is maintained throughout the exchange.

Figure 7:
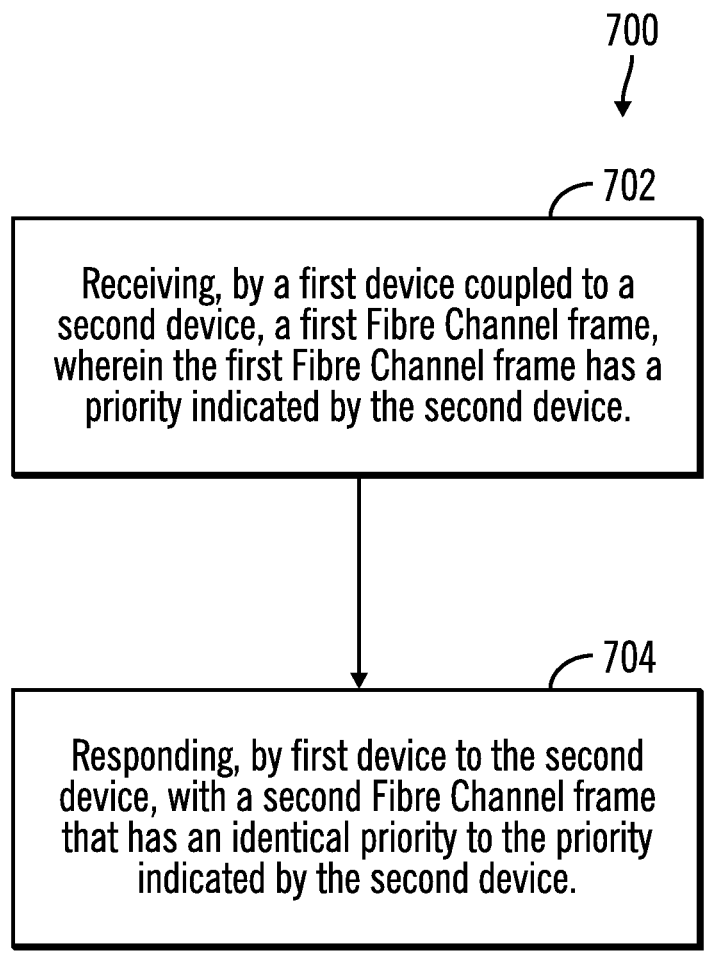
FIG. 7 illustrates a third flowchart that shows operations performed for maintaining priority within a single exchange, in accordance with certain embodiments.

FIG. 7 illustrates a third flowchart 700 that shows operations performed for maintaining priority within a single exchange, in accordance with certain embodiments. The operations shown in FIG. 7 may be performed by the storage controller application 112 that executes in the storage controller 102.

Control starts at block 702 in which a first device (e.g., the storage controller 102) that is coupled to a second device (e.g., the host 104) receives a first Fibre Channel frame, where the first Fibre Channel frame has a priority indicated by the second device (e.g., the host 104). The first device (e.g., the storage controller 102) responds (at block 704) to the second device (e.g., the host 104) with a second Fibre Channel frame that has an identical priority to the priority indicated by the second device (e.g., the host 104). In certain embodiments, a determination is made as to whether the host 104, the fabric 106, and the storage controller 102 support priority indication in frames prior to including priority indications in the frames. In further embodiments, in response to determining that the fabric 106 (or some other fabric) does not support priority indication in frames, the host 104 avoids indicating priority in frames send from the host 104 to the storage controller 102 via the fabric 106.

Therefore FIGS. 1-7 illustrate certain embodiments in which priority is maintained for frames within the same exchange in a Fibre Channel protocol.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
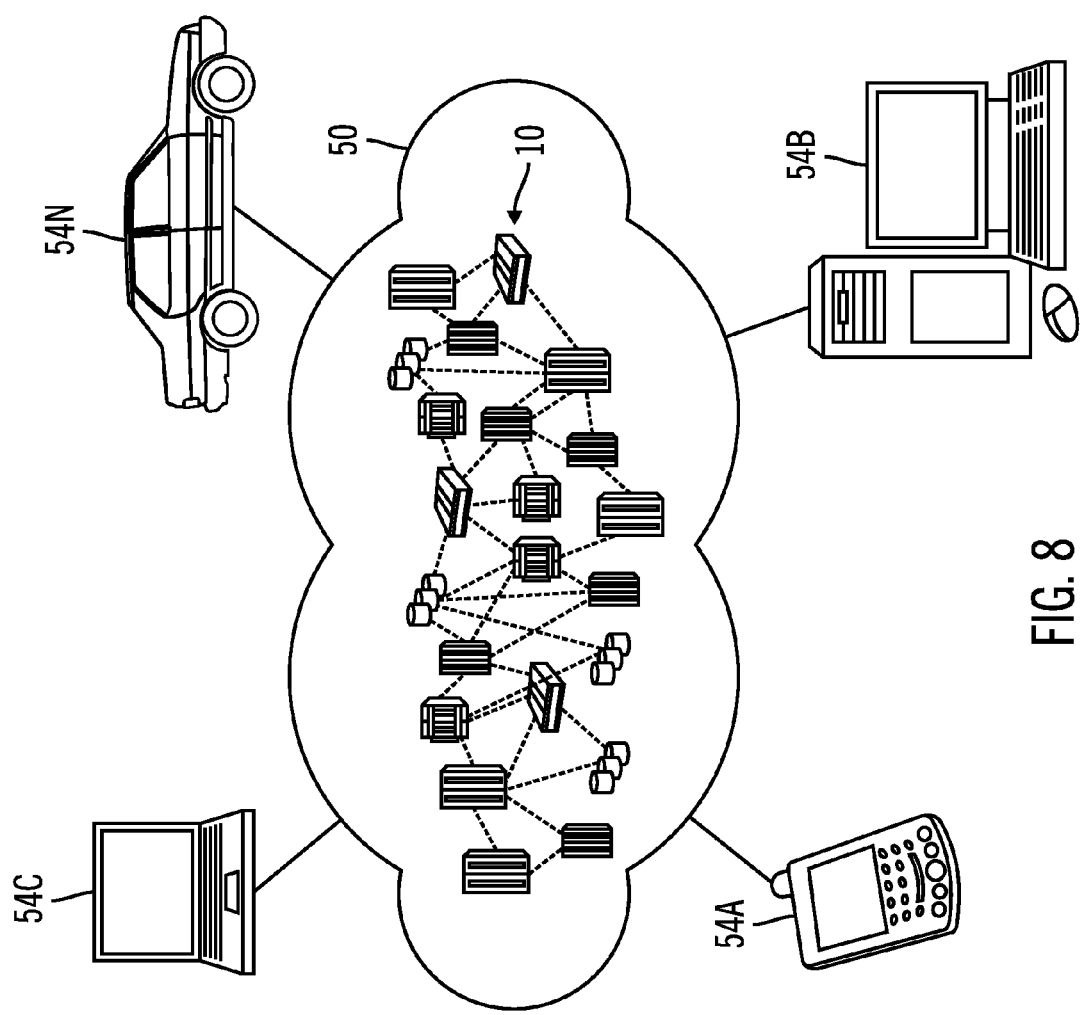
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
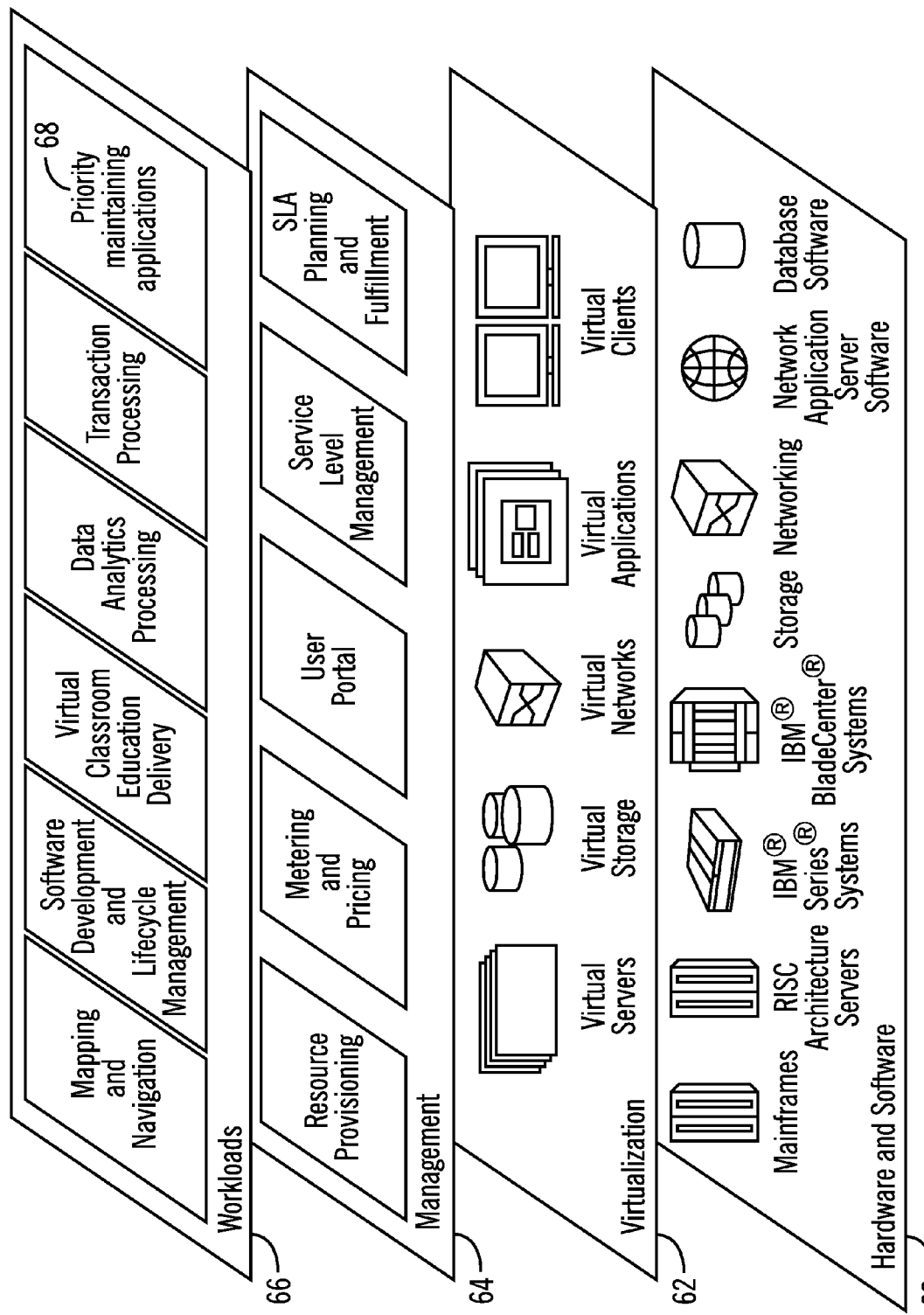
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the priority maintaining applications 68 (e.g., the host application 110 and the storage controller application 112) as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
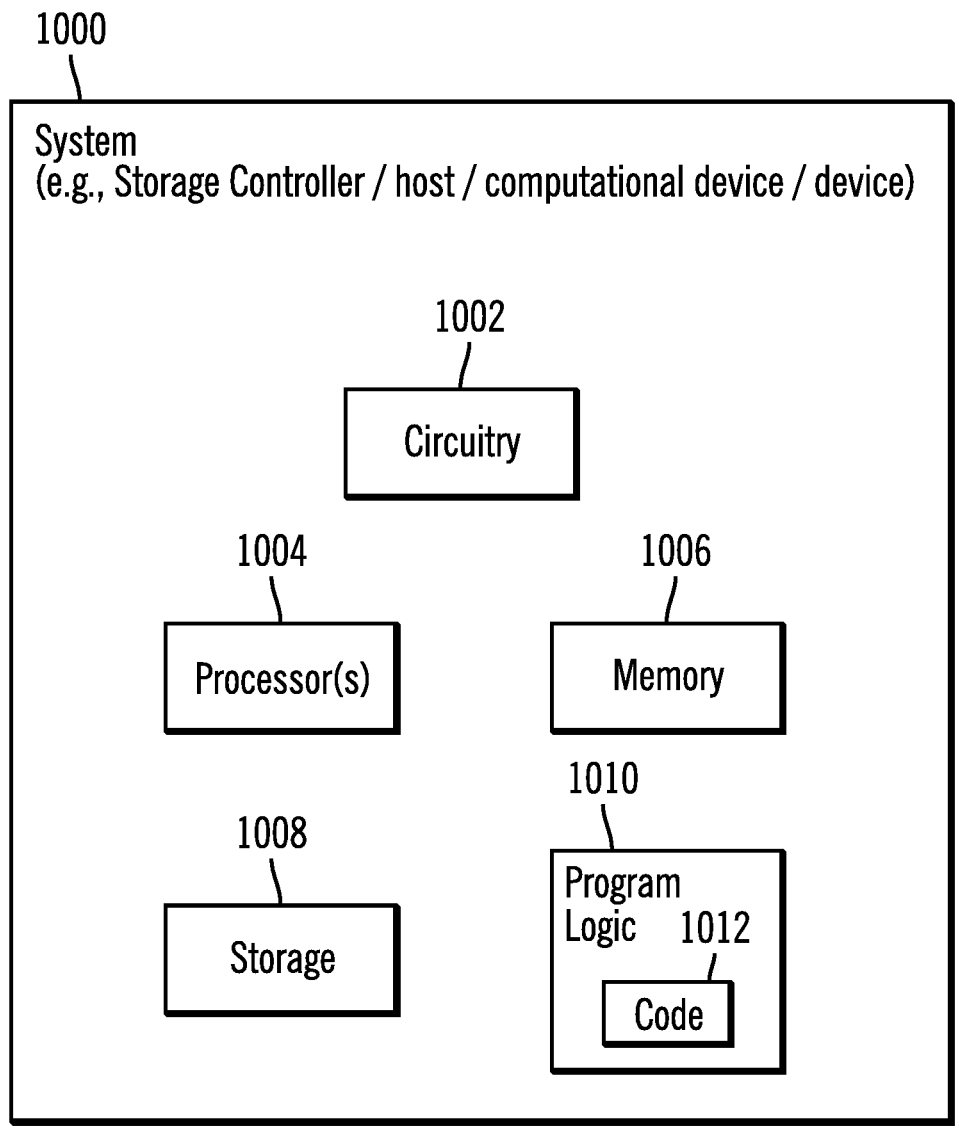
FIG. 10 illustrates a block diagram of a computational system that shows certain elements that may be included in the storage controller or the host shown in FIG. 1, in accordance with certain embodiments.

FIG. 10 illustrates a block diagram that shows certain elements that may be included in the host 104 or storage controller 102 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   receiving, by a first device coupled to a second device, a first Fibre Channel frame, wherein the first Fibre Channel frame has a priority indicated by the second device; and
   in response to receiving by the first device the first Fibre Channel frame, responding, by first device to the second device, with a second Fibre Channel frame that has an identical priority to the priority indicated by the second device, wherein the second device receives the second Fibre Channel frame with the identical priority as the priority indicated by the second device in the first Fibre Channel frame, wherein the first Fibre Channel frame and the second Fibre Channel frame are included in a same exchange, wherein an exchange is comprised of a plurality of sequences, and wherein each sequence is comprised of one or more frames.

2. The method of claim 1, wherein:
   the first device is a storage controller that controls a plurality of storage devices;
   the second device is a host; and
   a fabric comprising one or more Fibre Channel switches couples the first device to the second device.

3. The method of claim 2, wherein the priority is indicated by programming a CS_CTL/Priority field in a frame header corresponding to first Fibre Channel frame, and the identical priority is indicated by programming the CS_CTL/Priority field in the frame header corresponding to the second Fibre Channel frame.

4. The method of claim 1, wherein the priority is maintained in the same exchange by programming a CS_CTL/Priority field.

5. The method of claim 2, the method further comprising:
   transmitting the first Fibre Channel frame, by the fabric, according to and with the priority indicated by the host to the storage controller; and
   transmitting the second Fibre Channel frame, by the fabric, according to and with the identical priority indicated by the storage controller to the host.

6. The method of claim 5, the method further comprising:
   determining whether the host, the fabric, and the storage controller supports priority indication in frames prior to including priority indications in the frames.

7. The method of claim 6, wherein the fabric is a first fabric, the method further comprising:
   in response to determining a second fabric does not support priority indication in frames, avoiding indicating priority in frames sent from the host to the second fabric.

8. A system comprising first device, wherein the first device is coupled to a second device, the system comprising:
   a memory; and
   a processor coupled to the memory, wherein the processor performs operations, the operations comprising:
   receiving, by the first device, a first Fibre Channel frame, wherein the first Fibre Channel frame has a priority indicated by the second device; and
   in response to receiving by the first device the first Fibre Channel frame, responding, by first device to the second device, with a second Fibre Channel frame that has an identical priority to the priority indicated by the second device, wherein the second device receives the second Fibre Channel frame with the identical priority as the priority indicated by the second device in the first Fibre Channel frame, wherein the first Fibre Channel frame and the second Fibre Channel frame are included in a same exchange, wherein an exchange is comprised of a plurality of sequences, and wherein each sequence is comprised of one or more frames.

9. The system of claim 8, wherein:
   the first device is a storage controller that controls a plurality of storage devices;
   the second device is a host; and
   a fabric comprising one or more Fibre Channel switches couples the first device to the second device.

10. The system of claim 9, wherein the priority is indicated by programming a CS_CTL/Priority field in a frame header corresponding to first Fibre Channel frame, and the identical priority is indicated by programming the CS_CTL/Priority field in the frame header corresponding to the second Fibre Channel frame.

11. The system of claim 8, wherein the priority is maintained in the same exchange by programming a CS_CTL/Priority field.

12. The system of claim 9, the operations further comprising:
   transmitting the first Fibre Channel frame, by the fabric, according to and with the priority indicated by the host to the storage controller; and
   transmitting the second Fibre Channel frame, by the fabric, according to and with the identical priority indicated by the storage controller to the host.

13. The system of claim 12, the operations further comprising:
   determining whether the host, the fabric, and the storage controller supports priority indication in frames prior to including priority indications in the frames.

14. The system of claim 13, wherein the fabric is a first fabric, the operations further comprising:
   in response to determining a second fabric does not support priority indication in frames, avoiding indicating priority in frames sent from the host to the second fabric.

15. A computer program product, the computer program product comprising:
- a computer readable storage medium having computer readable program code embodied therewith, the computer readable program code configured to perform operations on a processor, the operations comprising:
- receiving, by a first device coupled to a second device, a first Fibre Channel frame, wherein the first Fibre Channel frame has a priority indicated by the first device; and
- in response to receiving by the first device the first Fibre Channel frame, responding, by first device to the second device, with a second Fibre Channel frame that has an identical priority to the priority indicated by the second device, wherein the second device receives the second Fibre Channel frame with the identical priority as the priority indicated by the second device in the first Fibre Channel frame, wherein the first Fibre Channel frame and the second Fibre Channel frame are included in a same exchange, wherein an exchange is comprised of a plurality of sequences, and wherein each sequence is comprised of one or more frames.

16. The computer program product of claim 15, wherein:
- the first device is a storage controller that controls a plurality of storage devices;
- the second device is a host; and
- a fabric comprising one or more Fibre Channel switches couples the first device to the second device.

17. The computer program product of claim 16, wherein the priority is indicated by programming a CS_CTL/Priority field in a frame header corresponding to first Fibre Channel frame, and the identical priority is indicated by programming the CS_CTL/Priority field in the frame header corresponding to the second Fibre Channel frame.

18. The computer program product of claim 15, wherein the priority is maintained in the same exchange by programming a CS_CTL/Priority field.

19. The computer program product of claim 16, the operations further comprising:
- transmitting the first Fibre Channel frame, by the fabric, according to and with the priority indicated by the host to the storage controller; and
- transmitting the second Fibre Channel frame, by the fabric, according to and with the identical priority indicated by the storage controller to the host.

20. The computer program product of claim 19, the operations further comprising:
- determining whether the host, the fabric, and the storage controller supports priority indication in frames prior to including priority indications in the frames.

21. The computer program product of claim 20, wherein the fabric is a first fabric, the operations further comprising:
- in response to determining a second fabric does not support priority indication in frames, avoiding indicating priority in frames sent from the host to the second fabric.

* * * * *